W. DUMONT.
Smut Machine.

No. 2,971.

Patented Feb. 24, 1843.

UNITED STATES PATENT OFFICE.

WM. DUMONT, OF SENECA FALLS, NEW YORK.

SMUT-MACHINE.

Specification of Letters Patent No. 2,971, dated February 24, 1843.

*To all whom it may concern:*

Be it known that I, WM. DUMONT, of Seneca Falls, in the county of Seneca and State of New York, have invented a new and useful Improvement in Smut-Machines; and I do hereby declare that the following is a full, clear, and exact description thereof, reference being had to the accompanying drawing, making a part of this description, in which—

Figure 1:
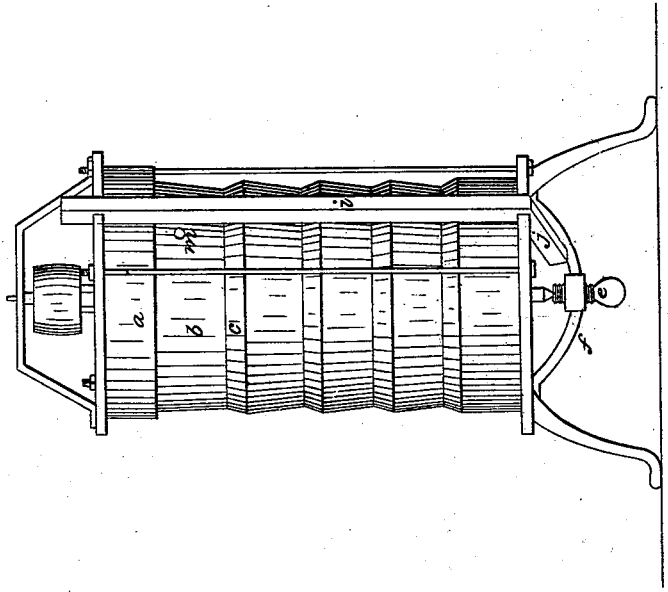
Figure 2:
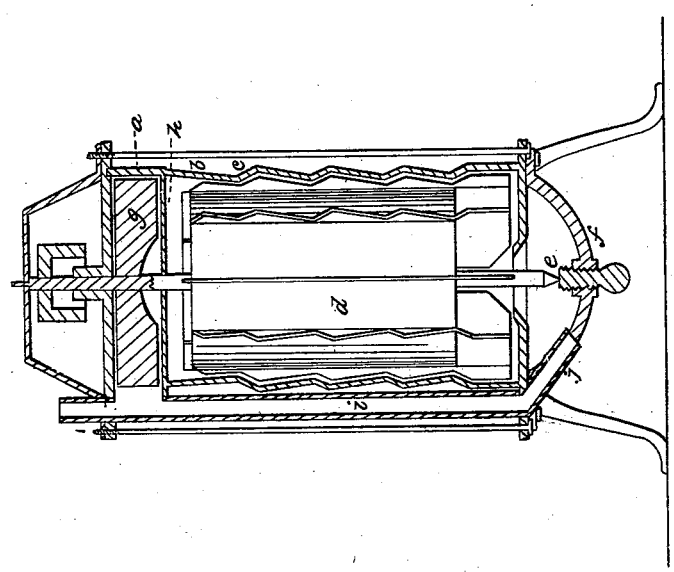

Figure 1 is a geometrical side view. Fig. 2, a section of the case showing the interior and cylinder.

The outside case of this machine is formed in staves; each one of which is intersected by indentations as follows; from the top, for some six inches down, the case is cylindric; ($a$) from thence, for about the same distance, it assumes the form of the segment of an inverted cone ($b$); this is joined by the section of a more obtuse cone ($c$); and its base is again connected, by a cone as above described; and so on in succession to the bottom. The inside assumes the same form as the out, and its inside is covered with vertical ribs. In the inside of this case a vertical cylinder ($d$) runs the lower end of its shaft resting on an adjustable pivot ($e$) in a cross pin ($f$) attached to the case. The other end of the shaft passes through a collar in the top of the case and carries a pulley on its end.

Between the top of the cylinder, and top of the case, a fan ($g$) is attached to the shaft, below which a diaphragm ($h$) is placed, having an aperture in the center. On the sides of the cylinder are ribs conforming in their outline to the form of the cylinder. These ribs or beaters extend down below the bottom of the cylinder and are then formed into fans which extend into the shaft between the lower end of the cylinder and the bottom of the case. The bottom has an aperture at the center for the exit of the grain. On one side of the case a vertical tube ($i$) is placed extending from a short tube ($j$) that runs in toward the center at an angle of about 45° up above the top of the case, which has an opening into it above the diaphragm. Through this tube the smut and garlic escapes above but should any grain be found up into it, it (the grain) falls down through the tube to the heap and if any dust is carried down it is drawn into the case by the lower fan and passes up out of the machine.

By the adjustable pivot ($e$) the beaters can be brought closer to the case or further from it so as to rub the grain more or less as required while by the shape of the case the dust has a free passage up out of the machine.

The grain enters the case at a small aperture ($m$) in the side of the case below the diaphragm and is carried around by the beaters till it is freed from smut the grain being retained longer by lowering the cylinder as the case may require.

Having thus fully described my machine I wish it to be understood that I do not claim the so making the rubbing surfaces of the runner as to be made to approach or recede from the case by raising or lowering, but

What I do claim as my invention and desire to secure by Letters Patent is—

The form and arrangement of the beaters with the case as herein described.

WM. DUMONT.

Witnesses:
   WM. CLARK,
   O. B. LATHAM.